United States Patent [19]

Iwatani et al.

[11] Patent Number: 5,061,889
[45] Date of Patent: Oct. 29, 1991

[54] VEHICLE AC GENERATOR CONTROL DEVICE FOR ADJUSTING OUTPUT VOLTAGE IN ACCORDANCE WITH VEHICLE CONDITIONS

[75] Inventors: Shiro Iwatani; Yutaka Kitamura, both of Hyogo, Japan

[73] Assignee: Mitsubishi Denki K.K., Tokyo, Japan

[21] Appl. No.: 549,985

[22] Filed: Jul. 9, 1990

[30] Foreign Application Priority Data

Jul. 13, 1989 [JP] Japan .................................. 1-180955

[51] Int. Cl.⁵ .............................................. H02J 7/16
[52] U.S. Cl. ......................................... 322/28; 322/29
[58] Field of Search ....................... 322/28, 29, 25, 27, 322/73; 361/20, 21

[56] References Cited

U.S. PATENT DOCUMENTS

| | | | |
|---|---|---|---|
| 3,852,653 | 12/1974 | Kuroda et al. | 322/28 X |
| 4,368,417 | 1/1983 | Matsuyama | 322/29 |
| 4,525,662 | 6/1985 | Kato et al. | 322/28 |
| 4,629,968 | 12/1986 | Butts et al. | 322/29 |
| 4,636,706 | 1/1987 | Bowman et al. | 322/28 |
| 4,914,374 | 4/1990 | Iwatani et al. | 322/28 |

FOREIGN PATENT DOCUMENTS 61-214731 9/1986 Japan .

Primary Examiner—Steven L. Stephan
Assistant Examiner—Kristine Peckman
Attorney, Agent, or Firm—Sughrue, Mion, Zinn Macpeak & Seas

[57] ABSTRACT

A vehicle AC generator control device, comprises: an AC generator with a field coil; a rectifier for rectifying an AC output of the AC generator; a battery connected to an output terminal of the rectifier; a voltage regulator with a switching element series-connected to the field coil, the voltage regulator detecting a terminal voltage of the rectifier or battery to operate the switching element to control a field current of the field coil to adjust an output voltage of the AC generator to a predetermined value; a field coil exciting power source for providing an output voltage which is higher than the output voltage of the AC generator; and a field current limiter for limiting a maximum conduction rate of the switching element according to a speed of rotation of the AC generator.

1 Claim, 3 Drawing Sheets

VEHICLE AC GENERATOR CONTROL DEVICE FOR ADJUSTING OUTPUT VOLTAGE IN ACCORDANCE WITH VEHICLE CONDITIONS

BACKGROUND OF THE INVENTION

This invention relates to a control device for a vehicle AC generator.

One example of a conventional control device for a vehicle AC generator is as shown in FIG. 5. In the case of the control device shown in FIG. 5, an AC generator 1 has an armature coil 101 and a field coil 102. A rectifier 2 for rectifying AC output voltages is connected to the AC generator 1. The rectifier 2 has a main output terminal 201, an auxiliary output terminal 202, and a ground terminal 203. One end of the field coil 102 is connected to a voltage regulator 3. The voltage regulator 3 comprises: voltage division resistors 301 and 302 for voltage detection; a control transistor 304 whose base electrode is connected through a Zener diode 303 to the connecting point of the two voltage division resistors 301 and 302; a power transistor 305 which is controlled by the transistor 304; a resistor 306; and a suppression diode 307.

The main output terminal 201 of the rectifier 2 is connected to a battery 4. The other end of the field coil 102 is connected through an initial exciting resistor 6 and a key switch 5 to the positive terminal of the battery 4.

The positive terminal of the battery 4 is connected through a load switch 8 to a vehicle electrical load 7.

The conventional control device thus designed operates as follows: When the key switch 5 is turned on, an initial exciting current flows in the field coil 102 through the initial exciting resistor 6, so that the field coil is placed in externally excited state at first. When field current flows and the generator 1 is driven, a power generation starts to induce AC voltage across the armature coil 101. And the field coil 102 is excited by the voltage provided through the auxiliary output terminal 202 of the generator 1, so that the former is placed in self-excited state.

The AC voltage induced on the armature coil 101 is rectified by the rectifier 2 and applied to the battery 4 to charge the latter 4. If, in this operation, the output voltage of the generator 1 is lower than a predetermined value, the voltage provided by the voltage division resistors 301 and 302 is also low. Accordingly, the Zener diode 303 is non-conductive, and the control transistor 304 is also non-conductive, so that the power transistor is conductive. As a result, the field current flowing in the field coil 102 is increased, and the output voltage of the generator 1 is increased accordingly. When, on the other hand, the output voltage of the generator 1 is higher than the predetermined value, the voltage provided by the voltage division resistors 301 and 302 is also high. Hence, the Zener diode is rendered conductive, and the control transistor 304 is also rendered conductive, so that the power transistor 305 is rendered non-conductive. Therefore, the field current is decreased, and the output voltage of the generator 1 is decreased accordingly. The above-described operations are repeatedly carried out until the output voltage of the generator 1 reaches the predetermined value. The suppression diode 307 is to absorb the surge induced on the field coil 102.

In this case, the maximum output of the generator depends on its speed of rotation as indicated by a characteristic curve "a" (broken lines) in FIG. 4; and the output is saturated with the speeds of rotation of about 5000 rpm and higher. The cross point of the generator output to the total vehicle electric load indicated by a characteristic curve "d" (two-dot chain line) is generally set at about 2500 rpm.

With the above-described conventional control device, upon start of power generation the field coil is excited by the output voltage of the generator 1; that is, it is self-excited. As was described above, the maximum output of the generator provides the characteristic curve "a" in FIG. 4, which depends on the speed of rotation of the generator, and the cross point of the generator output to the total vehicle electric load indicated by the characteristic curve "d" is set at about 2500 rpm. Therefore, when the range of speeds of rotation is divided into a high speed range and a low speed range with respect to about 2500 rpm as a border line, if the frequency of operation in the high speed range is in balance with that in the low speed range, or the former is higher than the latter, then no problem arises in view of the balance of charging and discharging the battery. However, if the frequency of operation in the low speed range lower than about 2500 rpm is increased as in the case of a traffic jam, then the output of the generator is liable to become insufficient; that is, the battery is liable to be insufficiently charged. Especially, when the vehicle is run at low speed at night using the head lamps so that the electric load is high, the battery may die to stop the engine.

SUMMARY OF THE INVENTION

Accordingly, an object of this invention is to eliminate the above-described difficulties accompanying a conventional vehicle AC generator control device. More specifically, an object of the invention is to provide a vehicle AC generator control device which can effectively eliminate the difficulty that, when the vehicle AC generator is operated at low speed and under over load, its output is insufficient so that the battery may not be sufficiently charged and it may die.

A vehicle AC generator control device according to the invention comprises: a field coil exciting power source for providing an output voltage higher than the output voltage of the AC generator; and a field current limiter for limiting the maximum conduction rate of a switching element adapted to control the field current according to the speed of rotation of the AC generator, whereby when the generator speed is in a range of low speeds, the field strength is increased, and when it is in a range of high speeds, the field strength is limited.

In the control device of the invention, when the speed of rotation of the AC generator is in the range of low speeds, the exciting voltage increased by the field coil exciting power source is applied to the field coil to increase the output of the generator. When the speed of rotation of the generator is in the range of high speeds, the maximum conduction rate of the switching element adapted to control the field current is limited according to the speed of rotation of the AC generator, so that the output of the generator is limited to a predetermined level.

DETAILED DESCRIPTION OF THE INVENTION

Figure 1:
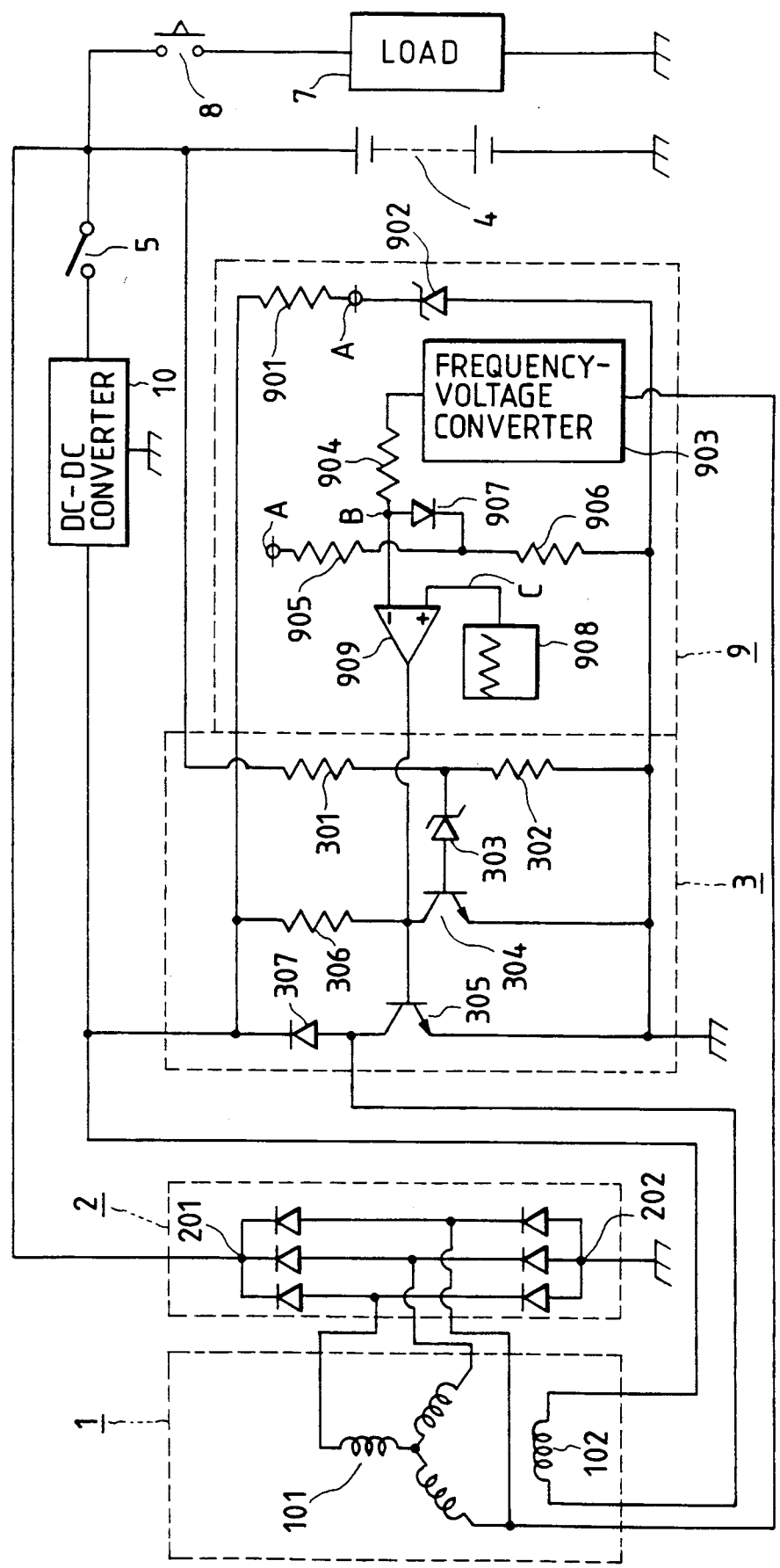
FIG. 1 a circuit diagram showing one example of a control device for a vehicle AC generator according to this invention.
Figure 2:
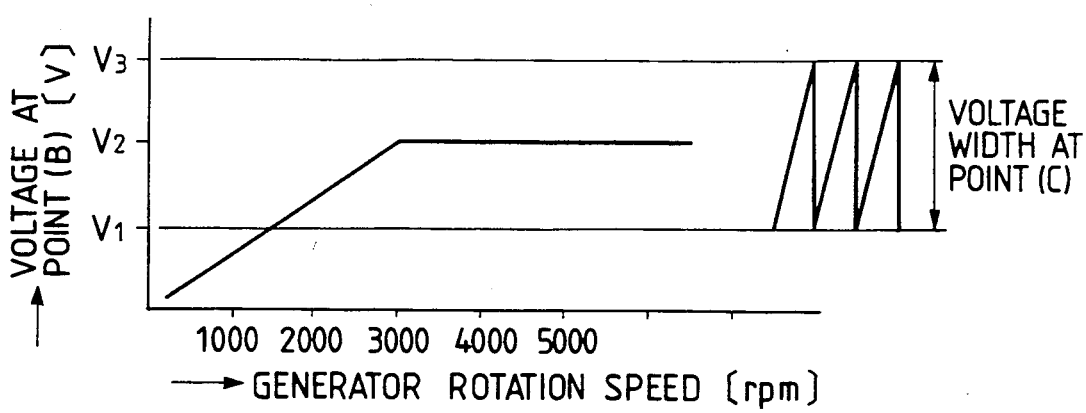
FIG. 2 is a characteristic diagram showing the output voltage of a frequency-voltage converter in the control device.

FIG. 1 is a circuit diagram showing one example of a control device for a vehicle AC generator according to this invention. As shown in FIG. 1, an AC generator 1 has an armature coil 101 and a field coil 102, to which a rectifier 2 is connected. The rectifier 2 has an output terminal 201 and a ground terminal 202. The output terminal 201 of the rectifier 2 is connected to a battery 4. On end of the field coil 102 is connected to a voltage regulator 3. The latter 3 comprises: voltage division resistors 301 and 302 for voltage detection; a control transistor 304 whose base is connected through a Zener diode 303 to the connecting point of the voltage division resistors 301 and 302; a power transistor 305 controlled by the control transistor 304; a resistor 306; and a suppression diode 307. The other end of the field coil 102 is connected through a DC-DC converter 10 (described later) and a key switch 5 to the output terminal 30 of the rectifier 2. The output terminal of the rectifier 2 is connected through a load switch 8 to a vehicle electric load 7. The control device further comprises a field current limiter 9 which includes: a resistor 901 and a Zener diode 902 which form a constant voltage source (A); a frequency-voltage converter 903 for converting the frequency of a single phase output of the generator 1 which correlates to the speed of rotation thereof into a voltage: voltage division resistors 905 and 906 for clamping the output voltage of the converter 903, i.e., the voltage at the point (B), to a predetermined value; a diode 907: a resistor 904; a saw-tooth wave generator 908 for producing a saw-tooth voltage signal having a constant period; and a comparator 909 for comparing the saw-tooth signal, i.e., the voltage at the point (C) in FIG. 1 with the output voltage of the above-described converted 903, i.e., the voltage at the point (B). The output terminal of the comparator 909 in the field current limiter 9 is connected to the base of the above-described power transistor 305.

The aforementioned DC-DC converter 10 connected to the field coil 102 raises the generator output voltage from 12 V to 24 V, and it is a power source for exciting the field coil 102.

The operation of the control device thus constructed will be described.

Figure 5:
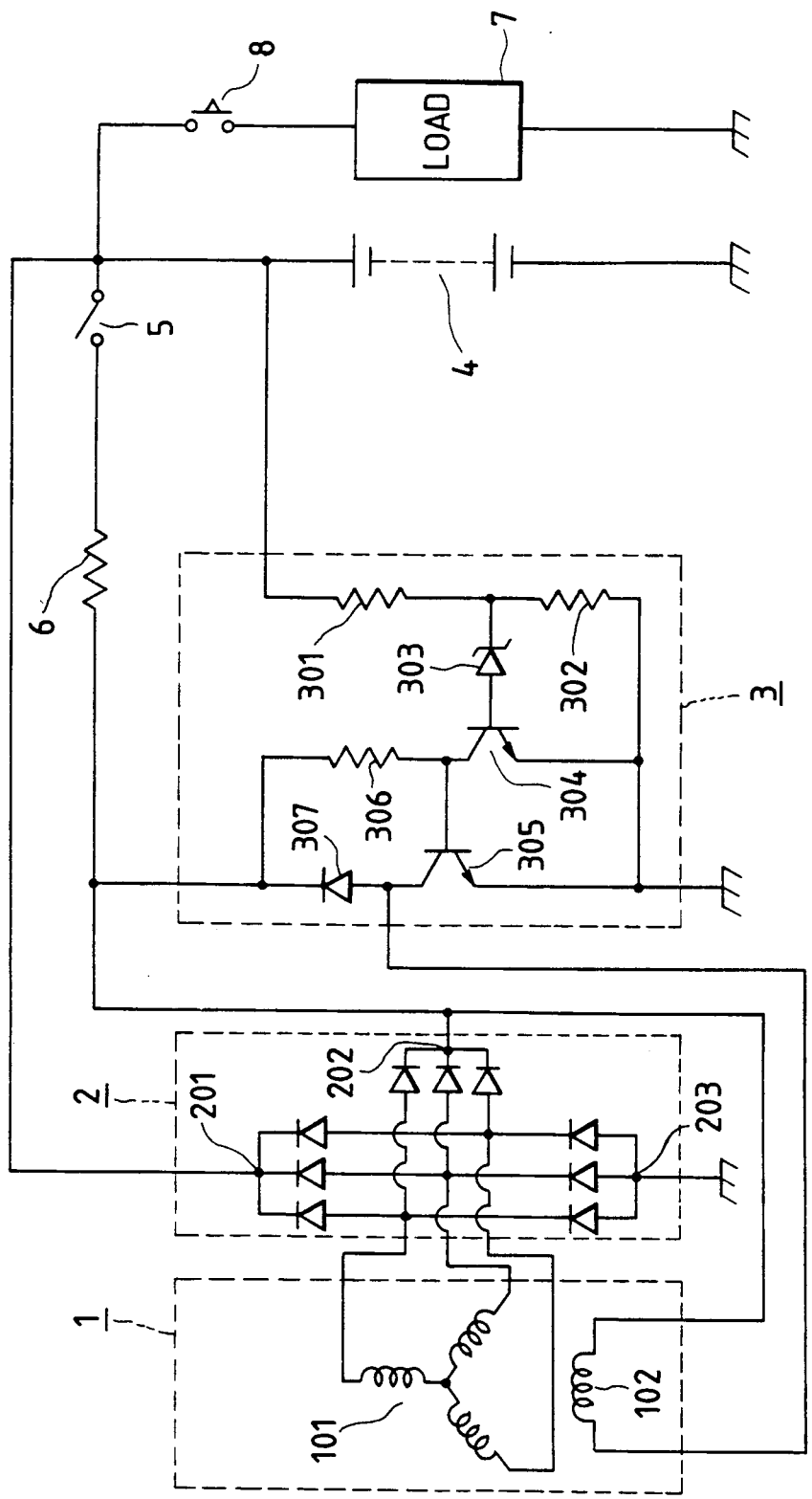
FIG. 5 is a circuit diagram showing a conventional control device a vehicle AC generator.

The operation from switching of the key switch 5 to power generation, and the voltage regulating operation are the same as those in the conventional control device shown in FIG. 5. With respect to the voltage width of the saw-tooth signal outputted by the saw-tooth wave generator 908; i.e., the voltage width ($V_1$–$V_3$) at the point (C), the field current limiter 9 sets the output voltage of the frequency-voltage converter 903; that is, the voltage at the point (B) in such a manner that the voltage at the point (B) be $V_1$ for a generator rotation speed of 1500 rpm, and be $V_2$ between $V_1$ and $v_3$ for 3000 rpm, and clamps it to $V_2$ for higher than 3000 rpm.

Figure 3:
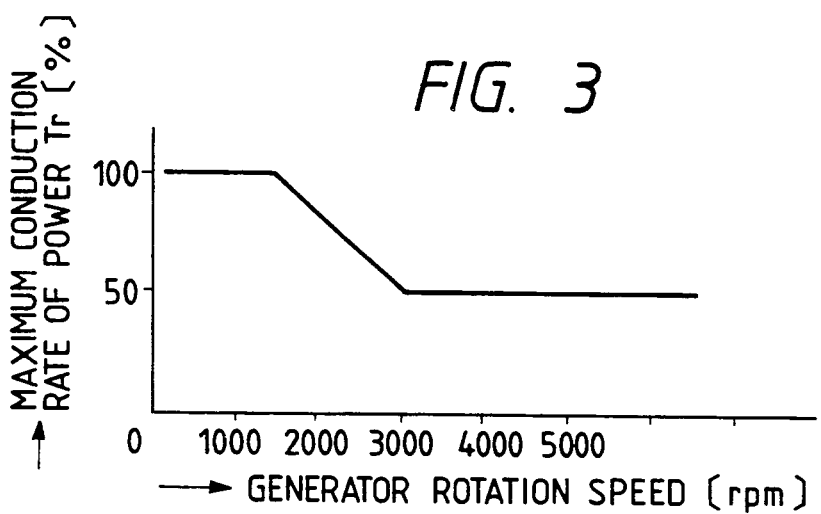
FIG. 3 is a characteristic diagram showing the maximum conduction rate of a power transistor in the control device.
Figure 4:
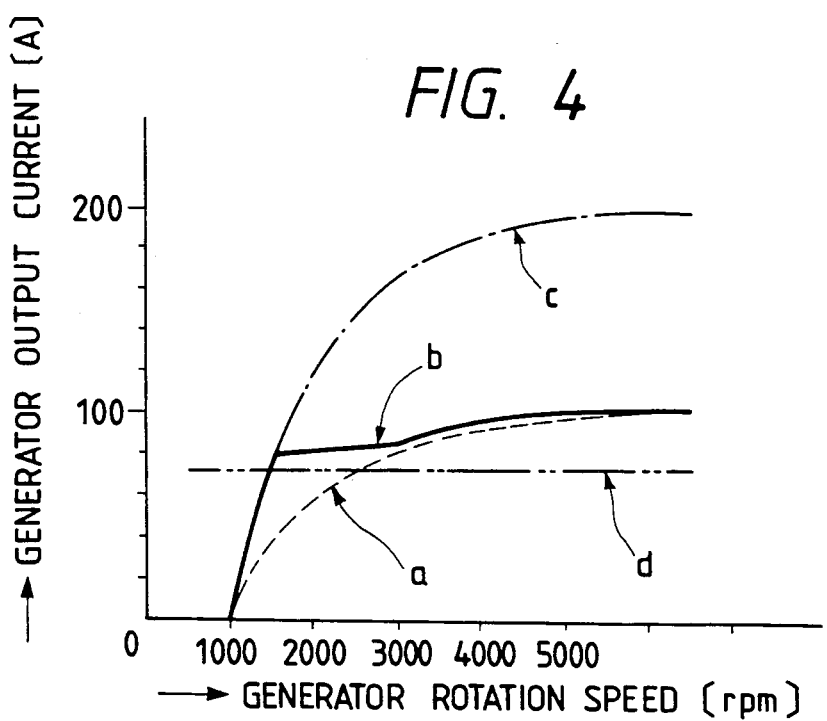
FIG. 4 is a characteristic diagram for a description of the output of the generator.

Therefore, the maximum conduction rate of the power transistor 305 controlled by the comparator 909, as shown in FIG. 3, is 100% for generator rotation speeds up to 1500 rpm, 50% for generator rotation speeds higher than 3000 rpm, and is linearly shifted from 100% to 50% as the generator rotation speed increases from 1500 rpm to 3000 rpm. Hence, the generator maximum output limited by the field current, which is controlled by the power transistor, is as indicated by a characteristic curve "b" (solid line) in FIG. 4. A characteristic curve "c" (one-dot chain line) in FIG. 4 indicates a generator maximum output provided in the case where the exciting voltage is merely increased from 12 V to 24 V. In this case, the generator maximum output is approximately twice as large as that in the conventional control device which is indicated by the characteristic curve "a". Accordingly, when the speed of rotation of the generator is in the low speed range, the generator maximum output can sufficiently cover the given load; however, when it is in the high speed range, the generator maximum output is excessively high; that is, the control device is low in efficiency. On the other hand, in the case of the control device according to the invention, as is apparent from the characteristic curve "b" (solid line), the cross point to the total vehicle electric load (characteristic curve "d") is lower than 1500 rpm, which is one at idling of an internal combustion engine and in practice cannot be the cross point to the total vehicle electric load. Thus, with the control device of the invention, the output sufficiently covers the load when the generator speed is in the low speed range; and when the generator speed is in the high speed range, the output is so controlled that it may not be increased higher than required.

As was described above, in the control device according to the invention, the field coil is externally excited at all times, and an exciting voltage higher than at least the output voltage of the AC generator is applied to the field coil, which eliminates the difficulty that, when the speed of the generator is in the low speed range, the output of the generator is insufficient. Accordingly, the difficulties are also eliminated that the battery is not sufficiently charged, and the battery dies to stop the engine. Furthermore, in the control device of the invention, the field current limiter limits the maximum conduction rate of the switching element for controlling the field current according to the speed of rotation of the generator, which eliminates the difficulty that, when the generator speed is in the high speed range, the output is excessively increased. Thus, the control device is high in efficiency. Accordingly, the control device covers the load with all the ranges of speeds of rotation; in other words, with the control device, it is unnecessary to determine whether the generator is in a high speed operation mode or in a low speed operation mode.

What is claimed is:

1. A vehicle AC generator control device, comprising:
    an AC generator including a field coil;
    a rectifier for rectifying an AC output of said AC generator;
    a battery connected to an output terminal of said rectifier;
    a voltage regulator including a switching element series-connected to said field coil, said voltage regulator detecting a terminal voltage at the output terminal of said rectifier to operate said switching element to control a field current of said field coil so that an output voltage of said AC generator is adjusted to a predetermined value;

a field coil exciting power source for providing an output voltage which is higher than the output voltage of said AC generator; and a field current limiter for limiting a maximum conduction rate of said switching element according to a speed of rotation of said AC generator.

* * * * *